United States Patent
He et al.

(10) Patent No.: US 8,865,346 B2
(45) Date of Patent: *Oct. 21, 2014

(54) CATHODE ELECTRODE AND LITHIUM ION BATTERY

(71) Applicants: Xiang-Ming He, Beijing (CN); Li Wang, Beijing (CN); Jian-Jun Li, Beijing (CN); Jian Gao, Beijing (CN)

(72) Inventors: Xiang-Ming He, Beijing (CN); Li Wang, Beijing (CN); Jian-Jun Li, Beijing (CN); Jian Gao, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/675,034

(22) Filed: Nov. 13, 2012

(65) Prior Publication Data

US 2014/0045059 A1    Feb. 13, 2014

(30) Foreign Application Priority Data

Aug. 9, 2012   (CN) .................. 2012 1 02819278

(51) Int. Cl.
```
H01M 4/66       (2006.01)
H01M 10/0525    (2010.01)
H01M 4/60       (2006.01)
H01M 4/137      (2010.01)
B82Y 30/00      (2011.01)
```
(52) U.S. Cl.
CPC ............. *H01M 4/663* (2013.01); *H01M 4/66* (2013.01); *Y02E 60/122* (2013.01); *H01M 10/0525* (2013.01); *B82Y 30/00* (2013.01); *H01M 4/608* (2013.01); *H01M 4/137* (2013.01); *H01M 4/60* (2013.01); *Y10S 977/734* (2013.01); *Y10S 977/948* (2013.01)
USPC .................. 429/211; 977/734; 977/948

(58) Field of Classification Search
None
See application file for complete search history.

(56) References Cited

U.S. PATENT DOCUMENTS

| | | | |
|---|---|---|---|
| 2006/0008700 A1 | 1/2006 | Yong et al. | |
| 2006/0234123 A1* | 10/2006 | Vallee et al. | 429/231.1 |
| 2009/0305135 A1* | 12/2009 | Shi et al. | 429/217 |

(Continued)

FOREIGN PATENT DOCUMENTS

| | | |
|---|---|---|
| CN | 1969407 | 5/2007 |
| TW | 201213366 | 4/2012 |

OTHER PUBLICATIONS

Fanous et al. Structure-Related Electrochemistry of Sulfur-Poly(acrylonitrile) Composite Cathode Materials for Rechargeable Lithium Batteries. Chemistry of Mateirals. Oct. 2011. pp. 5024-5028.*

(Continued)

*Primary Examiner* — Patrick Ryan
*Assistant Examiner* — Christopher Domone
(74) *Attorney, Agent, or Firm* — Novak Druce Connolly Bove + Quigg LLP (57) ABSTRACT

A cathode electrode of a lithium ion battery includes a cathode current collector and a cathode material layer. The cathode material layer is located on a surface of the cathode current collector. The cathode material layer includes a cathode active material. The cathode active material includes sulfur grafted poly(pyridinopyridine). The sulfur grafted poly(pyridinopyridine) includes a poly(pyridinopyridine) matrix and sulfur dispersed in the poly(pyridinopyridine) matrix. The cathode current collector includes a polymer substrate and a graphene layer located on a surface of the polymer substrate adjacent to the cathode material layer. A lithium ion battery using the cathode electrode is also disclosed.

10 Claims, 9 Drawing Sheets

(56) References Cited

U.S. PATENT DOCUMENTS

2009/0311604 A1* 12/2009 Nazar et al. ............. 429/231.8
2011/0165466 A1* 7/2011 Zhamu et al. ........... 429/231.8
2012/0059128 A1 3/2012 He et al.

OTHER PUBLICATIONS

Ren et al., Fabrication of Li ion battery with sulfurized polyacrylonitrile, Fabrication of Li ion battery with sulfurized polyacrylonitrile, Battery Bimonthly, 2008, vol. 38, No. 2, p. 73-74.

* cited by examiner

CATHODE ELECTRODE AND LITHIUM ION BATTERY

CROSS-REFERENCE TO RELATED APPLICATIONS

This application claims all benefits accruing under 35 U.S.C. §119 from China Patent Application No. 201210281927.8, filed on Aug. 9, 2012, in the China Intellectual Property Office, the disclosure of which is incorporated herein by reference.

BACKGROUND

1. Technical Field

The present disclosure relates to cathode electrodes and lithium ion batteries.

2. Description of Related Art

Polyacrylonitrile (PAN) is a high polymer composed of saturated carbon skeleton containing cyano groups on alternate carbon atoms. PAN itself is not conductive but can be sulfurized to form sulfurized polyacrylonitrile which is conductive and chemically active. Specifically, the PAN powder and sulfur powder are mixed to form a mixture. The mixture is then heated, thereby forming sulfurized polyacrylonitrile. The sulfurized polyacrylonitrile can be used as a cathode active material of a lithium ion battery and has a high discharge capacity at the first cycle.

However, as the cycling of the lithium ion battery continues, the discharge capacity of the lithium ion battery decreases dramatically, which induces a relatively low capacity retention of the lithium ion battery. As reported, the discharge capacity of the lithium ion battery decreases from 906.4 mAh at the first cycle to 740.0 mAh at the $20^{th}$ cycle. The capacity retention of the lithium ion battery after 20 cycles is only about 81.7%.

What is needed, therefore, is to provide a lithium ion battery using sulfurized polyacrylonitrile as the cathode active material, which has a relatively high capacity retention.

BRIEF DESCRIPTION OF THE DRAWINGS

Many aspects of the present disclosure can be better understood with reference to the following drawings. The components in the drawings are not necessarily to scale, the emphasis instead being placed upon clearly illustrating the principles of the present embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
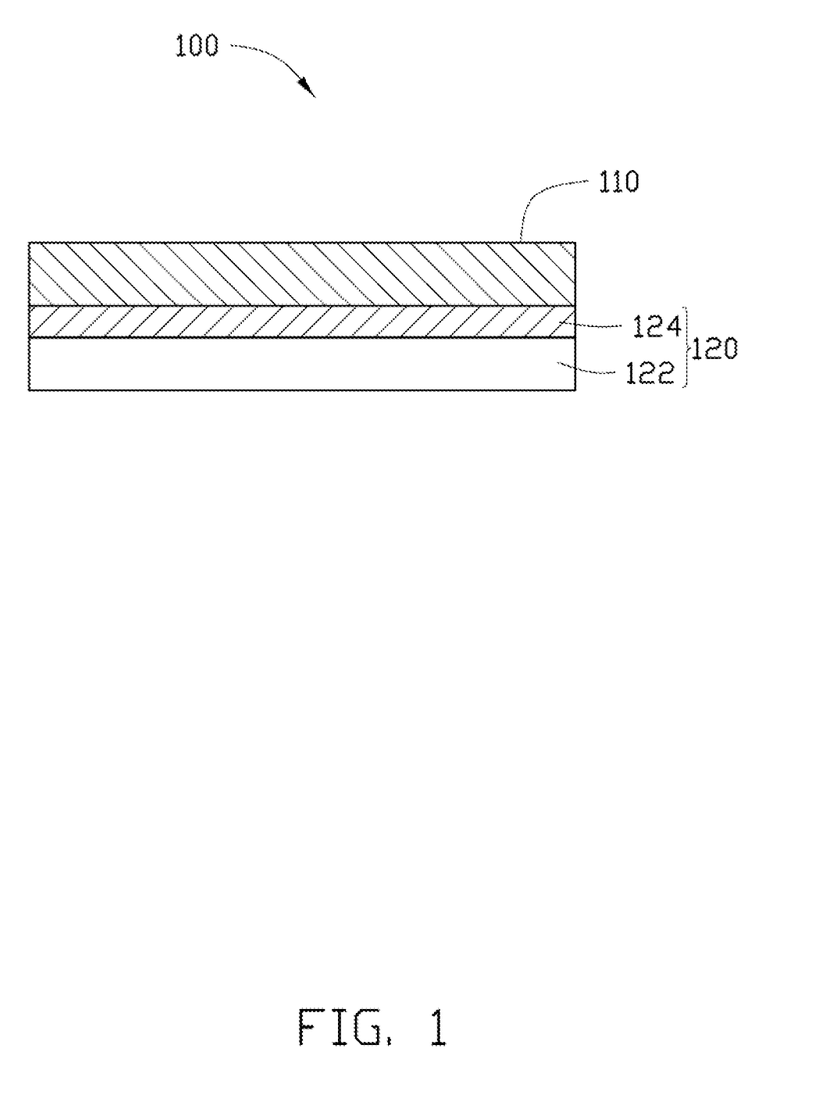
FIG. 1 is a side view of an embodiment of a cathode electrode of a lithium ion battery.

Referring to FIG. 1, one embodiment of a cathode electrode 100 of a lithium ion battery includes a cathode current collector 120 and a cathode material layer 110. The cathode current collector 120 is capable of supporting the cathode material layer 110 and conducting electric current. The cathode material layer 110 is located on a least one surface of the cathode current collector 120. The cathode material layer 110 includes a cathode active material, and can further include a conductive agent and a binder. The cathode active material, conductive agent, and the binder can be uniformly mixed with each other. The cathode active material includes a sulfur grafted poly(pyridinopyridine) (SPPY). The cathode current collector 120 includes a polymer substrate 122 and a graphene layer 124 located on at least one surface of the polymer substrate 122. The surface of the polymer substrate 122 having the graphene layer 124 located thereon is adjacent to the cathode material layer 110. More specifically, the polymer substrate 122 has a layered shape having a first surface and a second surface opposite to the first surface. The graphene layer 124 is located on the first surface. The cathode material layer 110 is located on the graphene layer 124, sandwiched between the graphene layer 124 and the polymer substrate 122.

Cathode Material Layer

The cathode active material in the cathode material layer 110 includes the SPPY. The SPPY includes a poly(pyridinopyridine) (PPY) matrix and sulfur dispersed in the PPY matrix. In one embodiment, a weight percentage of the sulfur in the SPPY is equal to or smaller than 41%.

A material of the PPY matrix includes a chemical group of formula (1):

wherein n is an integer larger than 1.

The PPY matrix is formed from a cyclizing reaction of polyacrylonitrile (PAN).

The sulfur dispersed in the PPY matrix can be combined with the PPY matrix as a dopant. That is to say, the sulfur is combined with the PPY matrix with a covalent bond. The sulfur can exist as a "poly-sulfur group" consisting of one or more sulfur elements, which can be represented by a formula of $S_x$, wherein x is an integer between 1 and 8. In one embodiment, $2 \leq x \leq 8$ (e.g., x=4). When the "poly-sulfur group" includes more than one sulfur element, the sulfur elements can be connected to each other as a chain. For example, if x=4, a formula of the "poly-sulfur group" is —S—S—S—S—, and if x=8, a formula of the "poly-sulfur group" is —S—S—S—S—S—S—S—S—, wherein "—" represents a covalent bond. The SPPY can include a plurality of the poly-sulfur groups dispersed in the PPY matrix and combined with the PPY matrix with the covalent bonds.

In one embodiment, the $S_x$ is doped in the chemical group of formula (1) and covalently bonded with a carbon element thereof. For example, the SPPY can include a chemical group of formula (2):

(2)

The molecular weight of the SPPY can be equal to or larger than 188.

The $S_x$ can also be covalently bonded with other functional groups at the other side of the sulfur chain. For example, the SPPY can include a chemical group of formula (3):

(3)

wherein R represents a functional group.

In the chemical group of formula (3), R is not limited and can be selected as needed, such as carboxyl groups, hydroxyl groups, and aromatic groups.

In another embodiment, R can also be the chemical groups of formula (1) or formula (2). For example, the SPPY can include a chemical group of formula (4):

(4)

wherein n1 and n2 are both integers larger than 1, and n1 and n2 can be the same or different.

The chemical group of formula (4) is formed by two chemical groups of formula (1) connected by the $S_x$. Further, in the chemical group of formula (4), the two connected pyridinopyridine groups belong to different chemical groups of formula (1).

In another embodiment, the two connected pyridinopyridine groups can also belong to the same chemical group of formula (1). The two connected pyridinopyridine groups can be adjacent to each other or spaced by other pyridinopyridine groups.

For example, the SPPY can include a chemical group of formula (5) having two adjacent pyridinopyridine groups connected by $S_x$:

(5)

When the two pyridinopyridine groups connected by Sx are spaced, the SPPY can include a chemical group of formula (6):

(6)

wherein Sy is also a "poly-sulfur group" including a sulfur chain, m and y are both an integer larger than 0. In one embodiment, m≤y≤6.

In another embodiment, the sulfur dispersed in the PPY matrix can be elemental sulfur composited with the PPY matrix. The elemental sulfur can have a shape of particles or grains. A size of the elemental sulfur particle can be very small. In one embodiment, one elemental sulfur particle can be one sulfur molecule (e.g., a $S_8$ ring). In another embodiment, one elemental sulfur particle can be a sulfur atom cluster consisting of a plurality of sulfur atoms. For example, the sulfur atom cluster can be $S_x$, wherein x is an integer between 1 and 7. As a large amount of the elemental sulfur particles are uniformly dispersed in the PPY matrix, and each elemental sulfur particle can be a sulfur molecule or sulfur atom cluster, the sulfur can be seen as monodispersed in the PPY matrix.

The SPPY can include the "poly-sulfur group" and the elemental sulfur. In the above formulas (1) to (6), the larger the value of n, n1, and n2, the more the pyridinopyridine groups are in the PPY matrix, the longer the chain of the pyridinopyridine groups, and the better the conductivity of the SPPY.

One embodiment of a method for making the SPPY includes steps of:

S1, mixing an elemental sulfur with a PAN to form a mixture;

S2, heating the mixture in vacuum or a protective gas at a temperature of about 250° C. to about 500° C., to form a sulfur contained composite; and S3, reacting the sulfur contained composite with a reducing agent for elemental sulfur in a liquid phase medium to remove part of the sulfur from the sulfur contained composite.

In the step S1, the elemental sulfur and the PAN can both have a shape of powder or particles. The powder or particles of the elemental sulfur and the PAN can be uniformly mixed by mechanically stirring at solid state. The molecular weight of the PAN is not limited, and can be in a range from 1000 to 100000. The amounts of the elemental sulfur and the PAN are not limited. In one embodiment, a mass ratio of the elemental sulfur and the PAN can be in a range from about 1:2 to about 10:1.

In the step S2, the solid elemental sulfur is heated to the gas state and uniformly contacts with the surface of the PAN. At the same time, the PAN has a pyrolysis and a cyclizing process during the heating. The sulfur that is in contact with the PAN is reacted with or combined with the cyclized PAN. In the sulfur contained composite, a majority of the sulfur is the "poly-sulfur group" covalently bonded with the PPY matrix. The other part of the sulfur is elemental sulfur grains uniformly distributed in and composited with the PPY matrix. The elemental sulfur grains have relatively large size and weight (e.g., larger than a molecular weight of $S_8$). The elemental sulfur grains are combined with the PPY matrix by a weak intermolecular force, such as van der Waals attractive force between the elemental sulfur grains and the PPY matrix. The protective gas can be an inert gas or a nitrogen gas.

Further, the step S2 can be processed in a sealed container filled with the protective gas. In the sealed container, the elemental sulfur will not leak out during heating. Further, due to the gasification of the elemental sulfur, the gas pressure in the sealed container can be larger than 1 atmospheric pressure. Therefore, the sealed container can promote the uniform dispersion of the sulfur in the product. In one embodiment, the heating temperature is about 320° C. to about 400° C. At the temperature of about 320° C. to about 400° C., the PAN can be fully cyclized to form a plurality of pyridinopyridine groups joined together, such that the n of formula (2) can be equal to or larger than 10. In one embodiment, the heating temperature is about 350° C. The heating time can be determined by the amount of the mixture, and can be in a range from about 1 hour to about 10 hours.

In one embodiment, the mixture is heated in a sealed autoclave at a temperature of 350° C. for about 2 hours, and the weight percentage of the sulfur in the product of step S2 is about 47%.

In the step S3, the reducing agent has a relatively strong reducibility and can have a reducing reaction with the elemental sulfur, to reduce the elemental sulfur to a lower valence (e.g., −2) of sulfur. For example, the elemental sulfur can be reduced to form the hydrogen sulfide ($H_2S$) or soluble sulfide, such as sodium sulfide ($Na_2S$), potassium sulfide ($K_2S$), and lithium sulfide ($Li_2S$). The reducing agent can be potassium borohydride ($KBH_4$) or hydrazine ($N_2H_4$).

The liquid phase medium can dissolve the reducing agent. The liquid phase medium can be water or ethanol. The sulfur contained composite is in solid state in the liquid phase medium and does not dissolve therein. The sulfur contained composite does not have a chemical reaction with the liquid phase medium. Thus, a liquid-solid mixture of the reducing agent and the sulfur contained composite can be formed in the liquid phase medium.

In the sulfur contained composite, there may be two forms of the sulfur, one is the "poly-sulfur group" covalently bonded with the PPY matrix, the other is the elemental sulfur grains. The elemental sulfur grains in relatively large sizes can be removed from the sulfur contained composite by having the reducing reaction. The sulfur contained composite can thus be formed into the SPPY having the "poly-sulfur groups" covalently bonded with the PPY matrix and/or the elemental sulfur in relatively small size.

Figure 2:
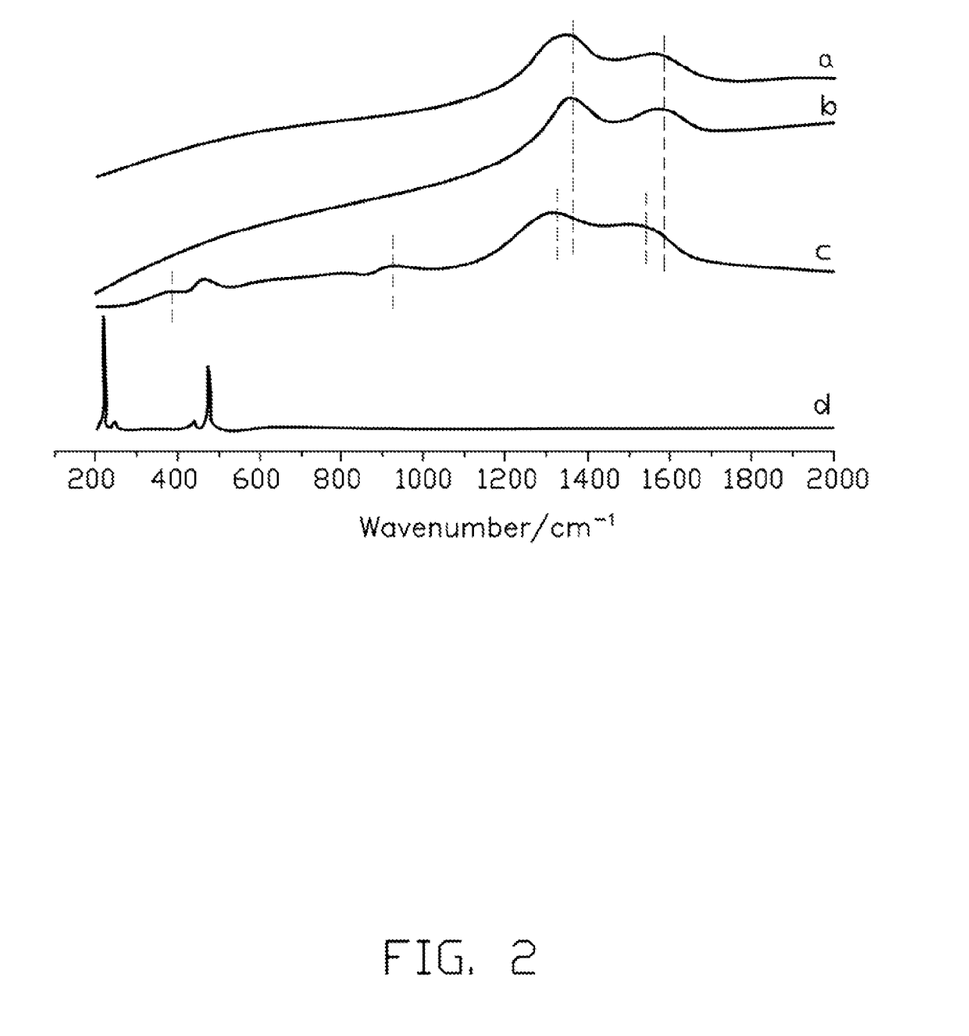
FIG. 2 shows a Raman spectra of (a) pyrolytic PAN in argon atmosphere, (b) pyrolytic PAN in air, (c) SPPY, and (d) elemental sulfur.

Referring to FIG. 2, the final product SPPY is compared with the elemental sulfur and the pyrolytic pure PAN in the Raman spectra. In FIG. 2, the curve a is the Raman spectra of the pyrolytic pure PAN formed by having pure PAN sintered in an Ar gas, the curve b is the Raman spectra of the pyrolytic pure PAN formed by having pure PAN sintered in air, the curve c is the Raman spectra of the final product having the heating step of S3 in vacuum, and the curve d is the Raman spectra of the elemental sulfur. FIG. 2 shows that the curves a and b both have main bands at 1582 $cm^{-1}$ and 1375 $cm^{-1}$, which are often referred to as the G mode and D mode, respectively. However, these bands (387 $cm^{-1}$ and 928 $cm^{-1}$) in the curve c (i.e., for SPPY) shift to a lower wavenumber, which indicates that the sulfur and the PPY matrix are bonded by C—S covalent bonds.

In the step S3, the reducing agent and the sulfur contained composite are added into the liquid phase medium. The amount of the reducing agent can be excessive, to completely remove the elemental sulfur grains in large sizes. However, the elemental sulfur in small size and the "poly-sulfur groups" cannot be removed because of a stronger van der Waals attractive force or the covalent bond between the sulfur and the PPY matrix. After the step S3, the weight percentage of the sulfur in the SPPY is equal to or less than 42%.

The step S3 can includes steps of:

S31, introducing the sulfur contained composite into a container having the liquid phase medium filed therein;

S32, uniformly dispersing the sulfur contained composite in the liquid phase medium through mechanically stirring or ultrasonically vibrating;

S33, adding the reducing agent into the container while continuously mechanically stirring or ultrasonically vibrating the liquid phase medium, to dissolve the reducing agent in the liquid phase medium and react the reducing agent with the sulfur contained composite; and S34, separating the achieved SPPY from the liquid phase medium and purifying the achieved SPPY.

Further, in the step S33, the liquid phase medium can be heated to promote the chemical reaction between the reducing agent and the sulfur contained composite. The heating temperature in the step S33 can be in a range from about 90° C. to about 150° C.

After the step S3, the method can further include a step S4 of electrochemically reducing the "poly-sulfur groups" of $S_x$ into an elemental sulfur. The reducing voltage for the electrochemically reducing "poly-sulfur group" of $S_x$ can be about 1.7 V to about 1.75 V (vs. $Li^+/Li$). In one embodiment, the final product can be arranged in an electrochemical reactor (e.g., in an electrochemical battery) as an anode electrode, and then the battery is discharged at a voltage of about 1.7 V to about 1.75 V (vs. $Li^+/Li$). In one embodiment, the counter electrode is lithium metal, the battery is discharged using a constant current density of about 20 mA/g until the battery reaches a discharge cut-off voltage of about 0 V. The "poly-sulfur group" has one or more sulfur elements (smaller than 8), and the "poly-sulfur group" is joined to the carbon atoms of the PPY matrix by covalent bonds. Thus, due to the electrochemically reducing step, the covalent bonds are broken, and a plurality of elemental sulfur particles, each of which is one sulfur molecule (e.g., a $S_8$ ring) or a sulfur atom cluster having 1 to 7 sulfur atoms can be formed. The plurality of elemental sulfur particles are uniformly dispersed in the PPY matrix. However, the electrochemically reducing step of the step S4 is an irreversible reaction. The elemental sulfur particles cannot be joined to the carbon atoms of the PPY matrix again by covalent bonds through an electrochemically oxidizing step.

The cathode material layer 110 can further include a conducting agent and a binder. The conductive agent can be a carbonaceous material such as carbon black, acetylene black, conductive polymers, carbon fibers, carbon nanotubes, graphene, and graphite. The binder can be at least one of polyvinylidene fluoride (PVDF), polytetrafluoroethylene (PTFE), and styrene-butadiene rubber (SBR).

Cathode Current Collector

The cathode current collector 120 includes the polymer substrate 122 and the graphene layer 124. The polymer substrate 122 can be a continuous film or a microporous network sheet. The polymer substrate 122 is capable of carrying the graphene layer 124 and the cathode material layer 110. The thickness of the polymer substrate 122 can be in a range from about 1 micron to about 200 microns. The material of the polymer substrate 122 can have a small density and a good resistance to the erosion of the electrolyte solution of the lithium ion battery. The material of the polymer substrate 122 can be polypropylene (PP), polyethylene (PE), polyethylene terephthalate (PET), polyvinyl alcohol (PVA), polyvinyl chloride (PVC), polystyrene (PS), or acrylonitrile-butadiene-styrene copolymer (ABS). Compared with metal, the polymer substrate 122 can have a relatively better endurance and flexibility and a relatively smaller weight. The lithium ion battery using the current collector 120 can have a relatively small weight and relatively high energy density. In one embodiment, the lithium ion battery having the cathode electrode 100 with a capacity of 10 Ah can have an energy density larger than 420 Wh/kg.

The graphene layer 124 of the cathode current collector 120 can be a continuous film shaped structure covered on the at least one surface of the polymer substrate 122. The graphene layer 124 having one surface directly contacting the surface of the polymer substrate 122 and having another surface directly contacting the surface of the cathode material layer 110.

The graphene layer 124 can be combined with the polymer substrate 122 by a compressive pressure, and the graphene layer 124 and the polymer substrate 122 can be combined by intermolecular forces. In another embodiment, the graphene layer 124 and the polymer substrate 122 can be combined by a binder. Further, the cathode current collector 120 can include two graphene layers 124 respectively covers the two opposite surfaces of the polymer substrate 122.

In one embodiment, the graphene layer 124 can be a single continuous and integrated graphene sheet. Specifically, the graphene layer 124 can be a single graphene.

In another embodiment, the graphene layer 124 includes a plurality of graphene sheets overlapped with each other to form the continuous graphene layer 124. The plurality of graphene sheets can be combined with each other by van der Waals attractive forces therebetween.

The graphene sheet can be a single layer of graphene or multi-layers of graphene. In one embodiment, the graphene sheet includes 1 layer to 10 layers of graphene. The graphene is a one-atom-thick planar sheet of $sp^2$-bonded carbon atoms that are densely packed in a honeycomb crystal lattice.

A thickness of the graphene layer 124 can be in a range from about 0.8 nanometers to about 5 microns. In one embodiment, the thickness of the graphene layer 124 is in a range from about 0.8 nanometers to about 1 micron. In another embodiment, the thickness of the graphene layer 124 is the thickness of the graphene (e.g., about 0.8 nanometers).

The graphene layer 124 can have a relatively good conductivity. The moving speed of electrons in the graphene can be $\frac{1}{300}$ the speed of light, which is much larger than the moving speed of the electrons in other materials. Further, the graphene has a relatively large specific surface area, which can combine well with the polymer substrate 122 and the cathode material layer 110. The cathode current collector 120 having the graphene layer 124 can have a high conductivity and chemical stability.

The graphene layer 124 can be formed on the surface of the polymer substrate 122 by applying a graphene contained liquid solution onto the surface of the polymer substrate 122. In the graphene contained liquid solution, the graphene powders are dispersed in a solvent such as volatile organic solvent and water by mechanically stirring or ultrasonically vibrating. The graphene contained liquid solution can be applied onto the surface of the polymer substrate by spraying, brushing, spreading, electrostatic coating, roll coating, or screen printing. The polymer substrate 122 having the graphene contained liquid solution applied thereon can be dried to form the graphene layer 124 on the surface of the polymer substrate 122. The graphene layer 124 formed from the graphene contained liquid solution can consist of a plurality of graphene sheets contacting and overlapping with each other.

The graphene layer 124 can also be first formed on a base and then transformed from the base to the surface of the polymer substrate 122. A single continuous and integrated graphene sheet can be grown on a silicon base using a chemical vapor deposition method. The polymer substrate 122 can be compressed onto the grown graphene sheet on the silicon base. The combination force between the polymer substrate 122 and the graphene sheet can be stronger than the combination force between the graphene sheet and the silicon base. Thus, by peeling the polymer substrate 122 from the silicon base, the graphene sheet can be peeled together with the polymer substrate 122. Thus, the graphene sheet can be transferred from the silicon base to the surface of the polymer substrate 122 to form the graphene layer 124. In another embodiment, after compressing the polymer substrate 122 onto the graphene sheet on the silicon base, the silicon base can be removed by etching, to leave the graphene sheet on the polymer substrate 122.

Figure 3:
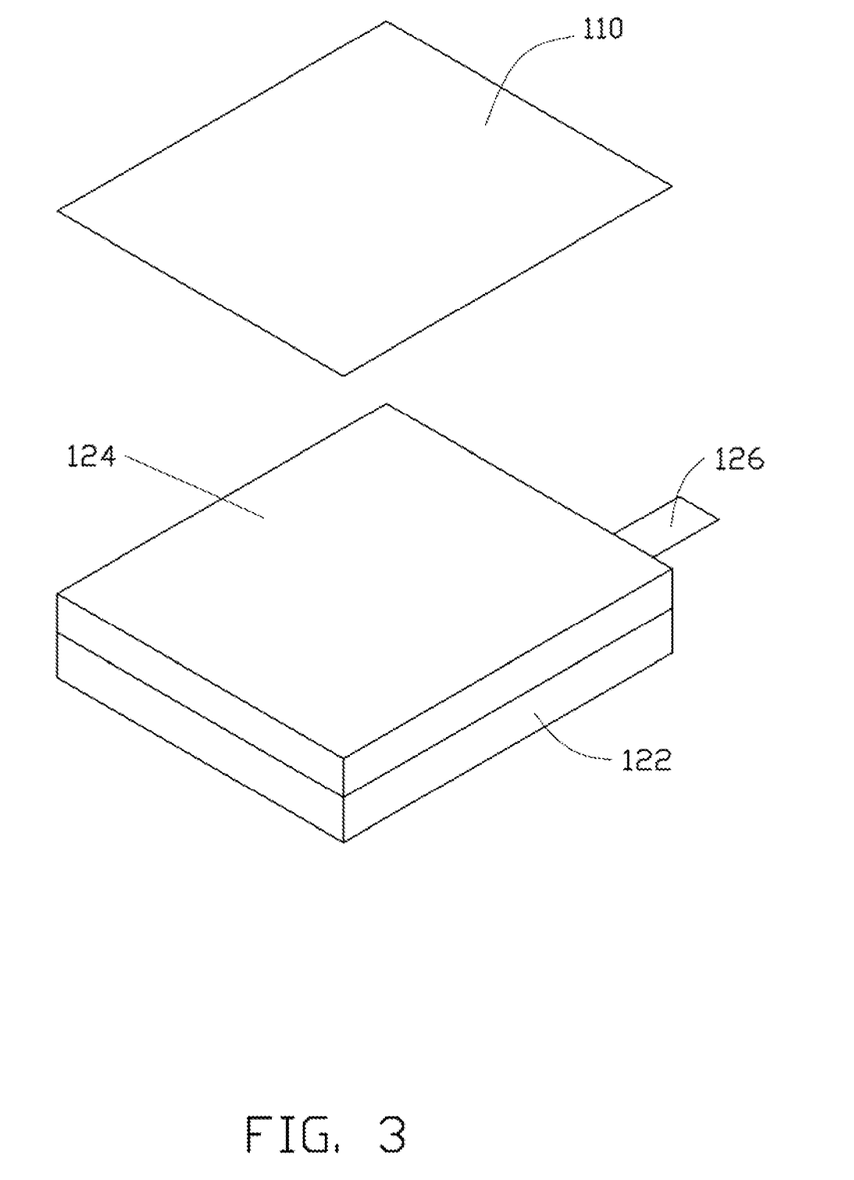
FIG. 3 is an exploded view of another embodiment of a cathode electrode of a lithium ion battery.

Referring to FIG. 3, the cathode current collector 12 can further include a connector tab 126 used to electrically connect the lithium ion battery to an outer circuit. The connector tab 126 can be in direct contact with the graphene layer 124 to electrically connect to the graphene layer 124. The connector tab 126 can have a sheet shape. A material of the conducting tab 16 can be metal. For example, the connector tab 126 can be a copper sheet, gold sheet, or aluminum sheet. The connector tab 126 can be fixed onto the polymer substrate 122. One end of the connector tab 126 can cover the graphene layer 126. The other end of the connector tab 126 can protrude from the graphene layer 126 and the polymer substrate 122.

Figure 4:
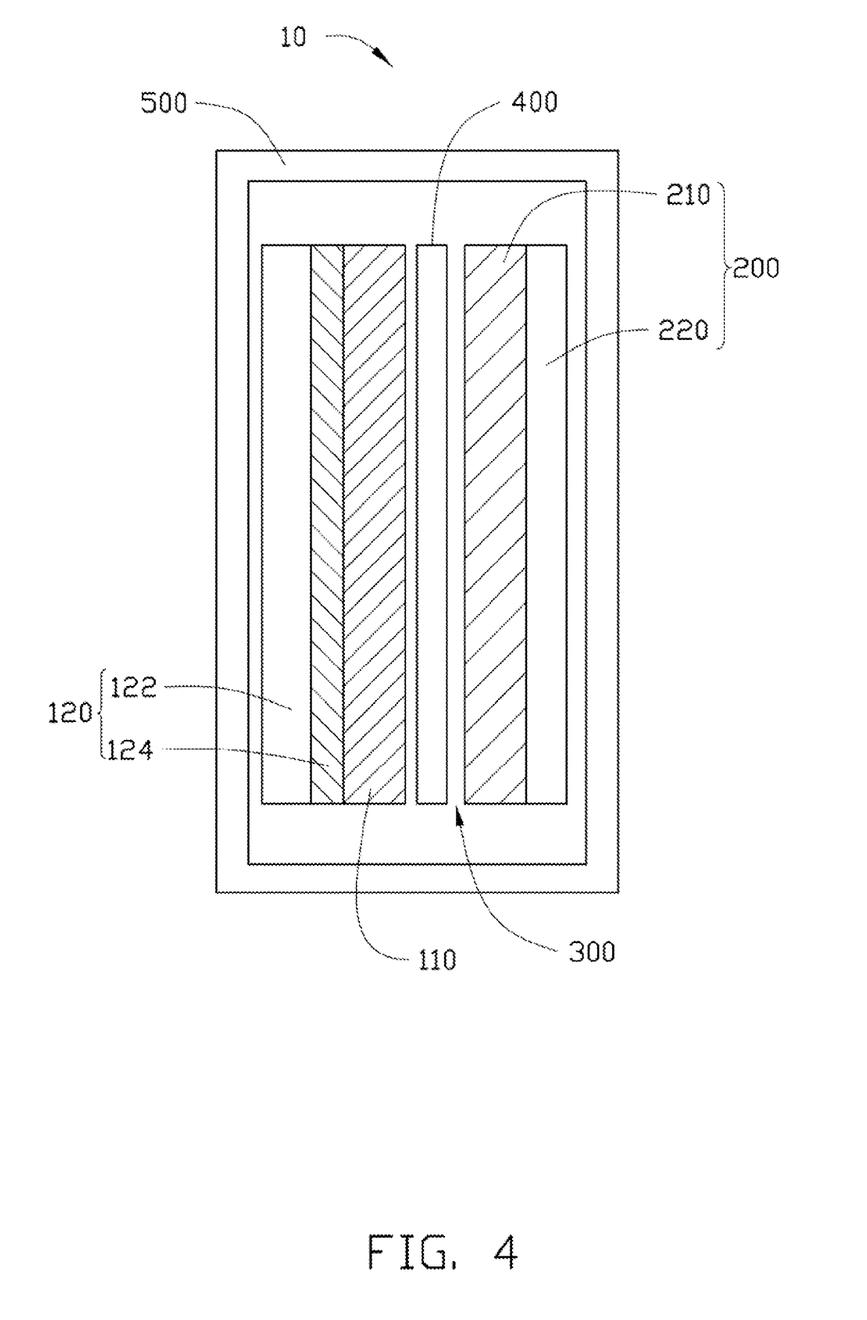
FIG. 4 is a schematic cross-sectional view of an embodiment of a lithium ion battery.

Referring to FIG. 4, one embodiment of a lithium ion battery 10 includes the cathode electrode 100, an anode electrode 200 spaced from the cathode electrode 100, and a non-aqueous electrolyte 300 disposed between the cathode electrode 100 and the anode electrode 200.

The anode electrode 200 can include an anode current collector 220 and an anode material layer 210. The anode current collector 220 is used for supporting the anode material layer 210 and conducting current. A shape of the anode current collector 220 can be a continuous sheet or a network.

A material of the anode current collector 220 can be metal or alloy, such as copper, nickel, or stainless steel. The anode material layer 210 is disposed on at least one surface of the anode current collector 220. The anode material layer 210 includes an anode active material, and can further include a conductive agent and a binder. The anode active material, conductive agent, and the binder can be uniformly mixed with each other.

The anode material layer 110 faces the cathode material layer 210. Both the anode material layer 210 and the cathode material layer 110 are in contact with the electrolyte 300. The electrolyte 300 can be a solid electrolyte film or a liquid non-aqueous electrolyte solution. The solid electrolyte film can be sandwiched between the anode electrode 200 and the cathode electrode 100. If the lithium ion battery 10 uses the liquid non-aqueous electrolyte solution, the cathode electrode 100 and the anode electrode 200 are both disposed in the liquid non-aqueous electrolyte solution. The lithium ion battery 10 can further include a separator 400 disposed between the anode material layer 210 and the cathode material layer 110 to electrically insulate them from each other and the lithium ions can pass therethrough. The liquid non-aqueous electrolyte solution includes an organic solvent and a lithium salt dissolved in the organic solvent. The organic solvent can be cyclic carbonates, linear carbonates, cyclic ethers, linear ethers, nitriles, and amides, and can be at least one of ethylene carbonate (EC), propylene carbonate (PC), ethylmethyl carbonate (EMC), diethyl carbonate (DEC), dimethyl carbonate (DMC), butylenes carbonate, vinylene carbonate, methylethyl carbonate, methyl acetate, ethyl acetate, propyl acetate, methyl propionate, ethyl propionate, γ-butyrolactone, 1,2-dimethoxyethane, 1,2-diethoxyethane, tetrahydrofuran, 1,2-dioxane, 2-methyltetrahydrofuran, acetonitrile, and dimethylformamide. The lithium salt can be at least one of $LiPF_6$, LiBOB, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, LiCl, and LiI. The separator 4 can be a porous membrane. The material of the separator can be polyolefins, such as polypropylene (PP) or polyethylene (PE), or inorganic material such as porous ceramics.

The materials of the anode electrode 200, the electrolyte 300, and the separator 400 are not limited by the above listed materials, and can be selected from other known materials.

The lithium ion battery 10 can further include an exterior encapsulating structure 500, such as a hard battery case sealed by a sealing member or a soft encapsulating bag. The exterior encapsulating structure 500 has the cathode electrode 100, the anode electrode 200, the separator 400, the electrolyte 300 located therein.

The two opposite surfaces of the cathode current collector 120 can both have cathode material layer 110 located thereon. The two opposite surfaces of the anode current collector 220 can both have anode material layer 210 located thereon. The lithium ion battery 10 can include a plurality of cathode electrodes 100 and anode electrodes stacked therewith.

In the lithium ion battery 10, the SPPY in the cathode material layer 110 and the graphene layer 124 in the cathode current collector 120 can be compatible to each other. Compared with the lithium ion battery using both the SPPY and the metal current collector, the lithium ion battery 10 can have a relatively higher capacity retention and better safety.

Example

In one example, a lithium ion battery is assembled by using the PET film as the polymer substrate of the cathode current collector. The thickness of the PET film is about 12 microns. The graphene powers are dispersed into N,N-dimethylformamide (DMF) to form a graphene solution having graphene in a weight percentage of 0.25%. The graphene solution is brushed onto the surfaces of the PET film and dried at about 80° C. for about 8 hours to form the cathode current collector. The SPPY is formed to have the weight percentage of sulfur element of about 42%. The SPPY as the cathode active material, acetylene black as the conducting agent, PVDF as the binder, and DMF as the solvent are mixed to form cathode slurry. A weight ratio of SPPY, acetylene black, and PVDF is about 7:2:1. The cathode slurry is coated onto the graphene layer of the cathode current collector and dried at about 120° C. for about 24 hours, to form the cathode electrode. The anode is lithium metal. The electrolyte solution is 1 mol/L $LiPF_6$ in EC and DEC (1:1, v/v). The lithium ion battery is assembled in a glove box.

Figure 5:
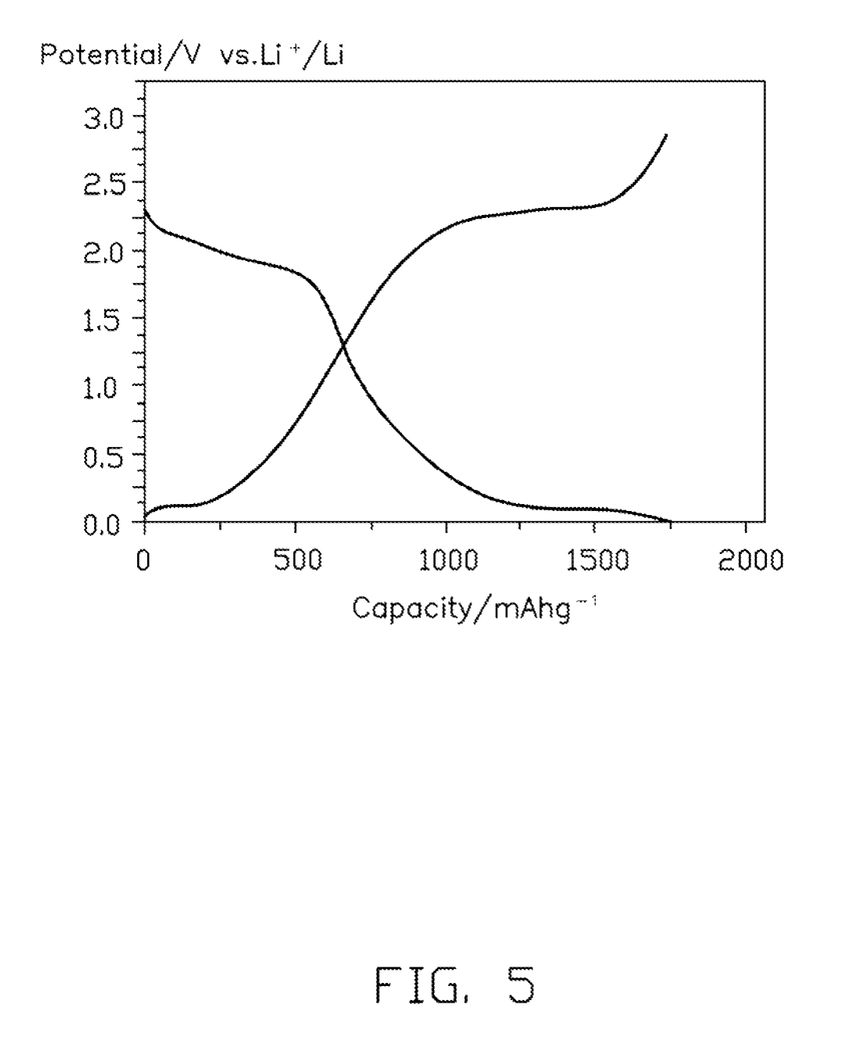
FIG. 5 shows discharge and charge curves of an embodiment of a lithium ion battery cycled between about 0 V to about 3 V.

Referring to FIG. 5, the lithium ion battery is galvanostatically charged and discharged at room temperature having a discharge cutoff voltage of about 0 V and a charge cutoff voltage of about 3 V. As shown in the charge and discharge curves of the lithium ion battery in FIG. 5, the curves have plateaus between a voltage range of about 0.1 V to about 0.25 V. Therefore, the SPPY in the voltage range of about 0.1 V to about 0.25 V has a reversible charge and discharge capacity. However, in the voltage range of about 0.1 V to about 0.25 V, the stability of an aluminum current collector is relatively low, thus can increase a safety risk and affect the cycling performance of the lithium ion battery. In the lithium ion battery using the graphene-polymer cathode current collector, the stability of the cathode current collector in the voltage range of about 0.1 V to about 0.25 V can be improved.

Figure 6:
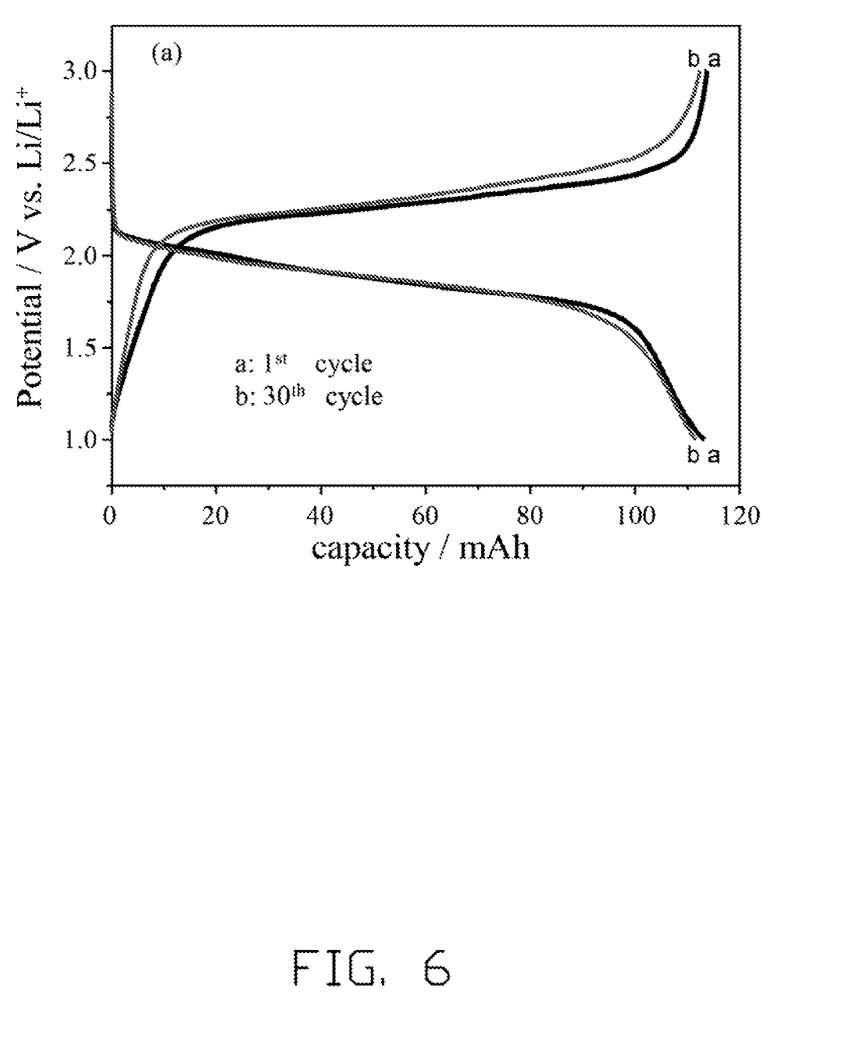
FIG. 6 shows discharge and charge curves of an embodiment of a lithium ion battery cycled between about 1 V to about 3 V.
Figure 7:
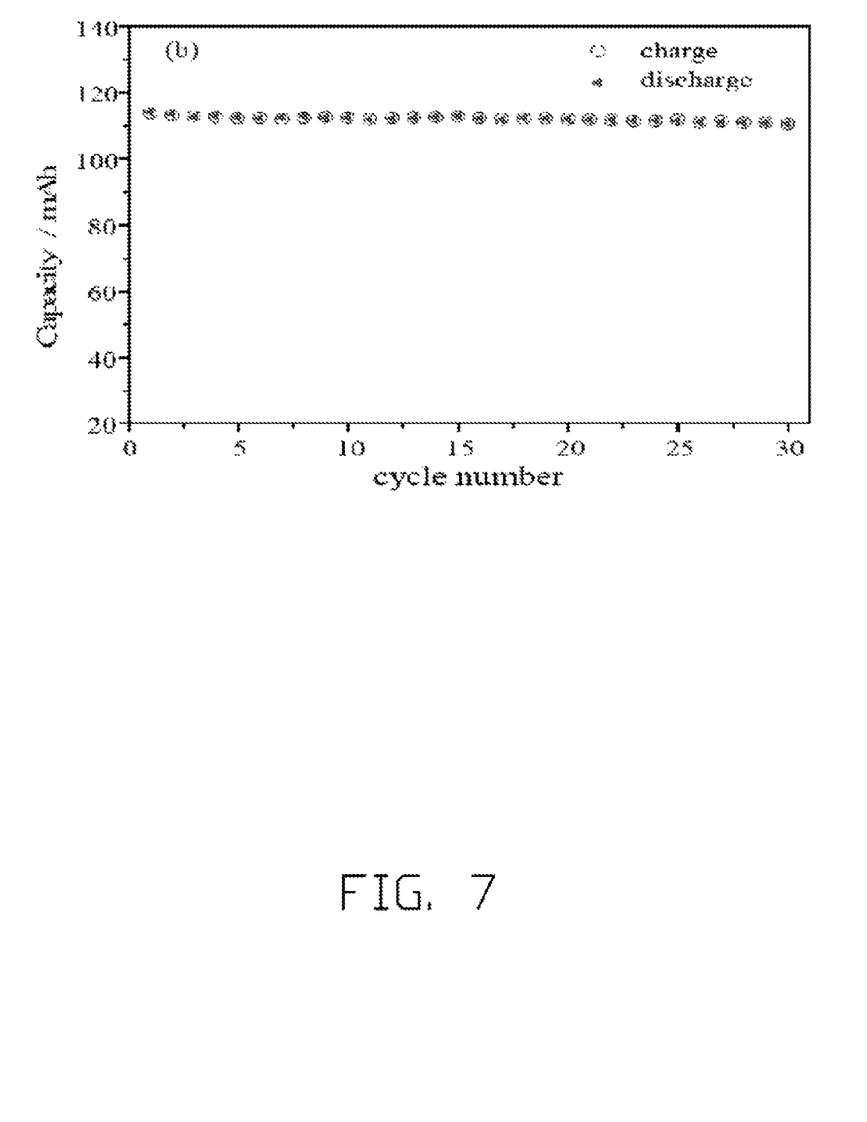
FIG. 7 shows a cycling performance of an embodiment of a lithium ion battery.

The lithium ion battery is also charged and discharged at about 30° C. having a discharge cutoff voltage of about 0 V and a charge cutoff voltage of about 3 V. During the first 3 cycles, the charge and discharge current is about 2 mA. After the first 3 cycles, the charge and discharge current is about 5 mA. Referring to FIG. 6 of the charge and discharge curves of the first cycle and the $30^{th}$ cycle, the charge voltage plateau is at about 2.24 V and the discharge voltage plateau is at about 1.95 V. The voltage difference between the charge voltage plateau and the discharge voltage plateau is smaller than 0.3V. Referring to FIG. 7, the discharge capacity for the first cycle is about 114.3 mAh, and larger than 110 mAh after 30 cycles. The coulombic efficiencies per cycle for the 30 cycles are above 96.8%. The percentage of capacity decrease per cycle is smaller than 0.11%.

Figure 8:
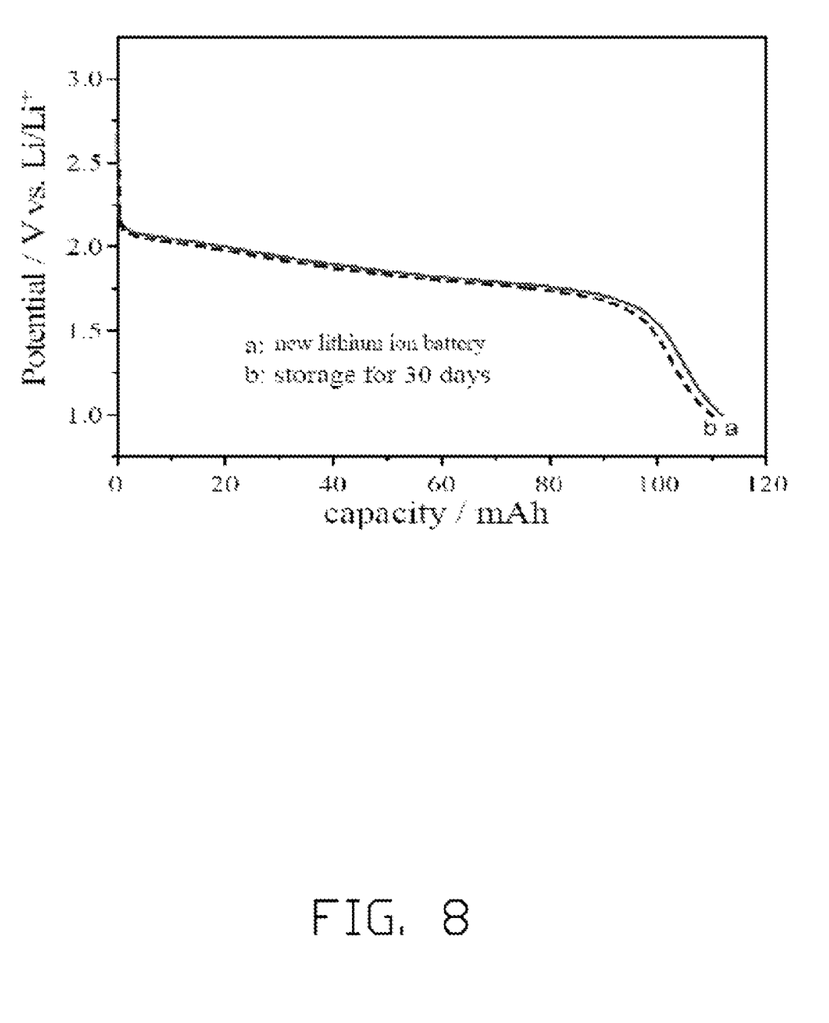
FIG. 8 shows a comparison between discharge curves of embodiments of a new lithium ion battery and a lithium ion battery stored for 30 days.
Figure 9:
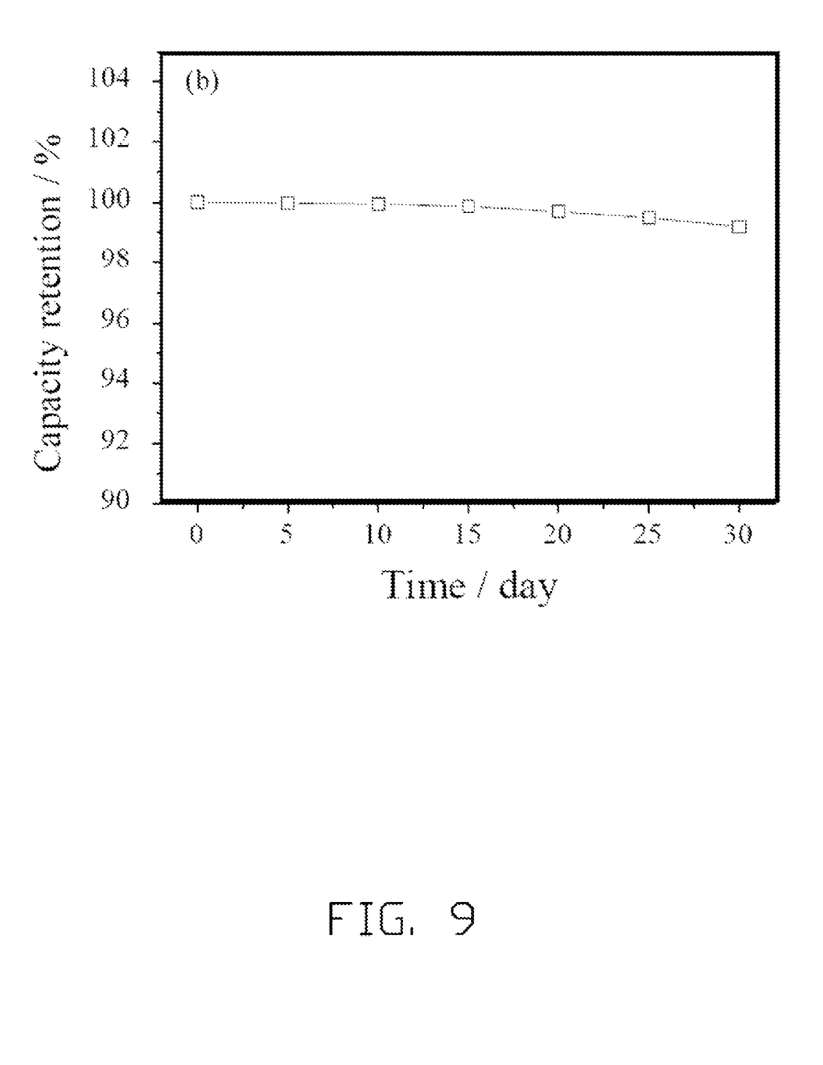
FIG. 9 shows capacity retentions of embodiments of lithium ion batteries stored for 0 days to 30 days.

Further, a self-discharge test is processed to the lithium ion battery. The same lithium ion batteries are firstly charged to about 3 V and stored respectively for 1 to 30 days. The stored lithium ion batteries are compared with another same lithium ion battery, which is just charged to about 3 V without any storing time. The lithium ion batteries are both discharged to 1 V. FIG. 8 shows the discharge curves of the two lithium ion batteries, one is stored for 30 days and the other one is not stored. FIG. 9 shows the capacity ratios of the lithium ion batteries respectively stored for 0 days, 5 days, 10 days, 15 days, 20 days, 25 days, and 30 days. The capacity ratio is the discharge capacity of the lithium ion battery divided by the discharge capacity of the lithium ion battery stored for 0 days. Referring to FIG. 8 and FIG. 9, though the discharge capacity decreases with the stored time, the capacity ratio is about 99.2% for the lithium ion battery stored for 30 days. That is, after storage for 30 days, the self-discharge ratio of the lithium ion battery is only about 0.8%.

Comparative Example

In a comparative example, the lithium ion battery has the same structure with the above example of the lithium ion battery, except that the cathode current collector is aluminum metal. The lithium ion battery of the comparative example is charge and discharge cycled and self-discharge tested using the same method as in the above example. After 30 cycles, the percentage of capacity decrease per cycle is about 0.32%. After stored for 30 days, the self-discharge ratio of the lithium ion battery is about 17%.

Depending on the embodiment, certain steps of the methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments can be associated with any other embodiments. The above-described embodiments illustrate the scope of the present disclosure but do not restrict the scope of the present disclosure.

What is claimed is:

1. A cathode electrode of a lithium ion battery comprising: a cathode current collector comprising a surface; and a cathode material layer located on the surface of the cathode current collector;
   wherein the cathode material layer comprises a cathode active material, the cathode active material comprises sulfur grafted poly(pyridinopyridine), the sulfur grafted poly(pyridinopyridine) comprises a poly(pyridinopyridine) matrix and sulfur dispersed in the poly(pyridinopyridine) matrix, and the cathode current collector comprises a polymer substrate and a graphene layer located on a surface of the polymer substrate adjacent to the cathode material layer,
   wherein the sulfur is a poly-sulfur group consisting of one or more sulfur elements represented by a formula of $S_x$, wherein x is an integer between 1 and 8, and the poly-sulfur group is combined with the poly(pyridinopyridine) matrix by a covalent bond, the sulfur grafted poly(pyridinopyridine) comprises at least one chemical group of formulas:

wherein n, n1, and n2 are an integer larger than 1, and m and y are both an integer larger than 0.

2. The cathode electrode of a lithium ion battery of claim 1, wherein the graphene layer is a single continuous and integrated graphene sheet.

3. The cathode electrode of a lithium ion battery of claim 1, wherein the graphene layer comprises a plurality of graphene sheets overlapping each other.

4. The cathode electrode of a lithium ion battery of claim 1, wherein the graphene layer consists of graphene.

5. The cathode electrode of a lithium ion battery of claim 1, wherein a thickness of the graphene layer is in a range from about 0.8 nanometers to about 5 microns.

6. The cathode electrode of a lithium ion battery of claim 1, wherein a material of the polymer substrate is selected from the group consisting of polypropylene, polyethylene, polyethylene terephthalate, polyvinyl alcohol, polyvinyl chloride, polystyrene, acrylonitrile-butadiene-styrene copolymer, and combinations thereof.

7. The cathode electrode of a lithium ion battery of claim 1, wherein the cathode current collector further comprises a connector tab to electrically connect the lithium ion battery to an outer circuit, the connector tab is directly contacting the graphene layer to electrically connect to the graphene layer.

8. The cathode electrode of a lithium ion battery of claim 1, wherein a weight percentage of the sulfur in the sulfur grafted poly(pyridinopyridine) is equal to or less than 42%.

9. A lithium ion battery comprising:
   a cathode electrode;
   an anode electrode spaced from the cathode electrode; and
   an electrolyte located between the cathode electrode and the anode electrode;
   wherein the cathode electrode comprises a cathode current collector having a surface, and a cathode material layer located on the surface of the cathode current collector, the cathode material layer comprises a cathode active material, the cathode active material comprises sulfur grafted poly(pyridinopyridine), the sulfur grafted poly(pyridinopyridine) comprises a poly(pyridinopyridine) matrix and sulfur dispersed in the poly(pyridinopyridine) matrix, the cathode current collector comprises a film shaped polymer substrate and a graphene layer located on a surface of the polymer substrate adjacent to the cathode material layer,
   wherein the sulfur is a poly-sulfur group consisting of one or more sulfur elements represented by a formula of $S_x$, wherein x is an integer between 1 and 8, and the poly-sulfur group is combined with the poly(pyridinopyridine) matrix by a covalent bond, the sulfur grafted poly(pyridinopyridine) comprises at least one chemical group of formulas:

wherein n, n1, and n2 are an integer larger than 1, and m and y are both an integer larger than 0.

10. The lithium ion battery of claim 9, wherein the anode electrode is lithium metal, and a discharge cut-off voltage of the lithium ion battery is about 0V.

* * * * *